J. W. LOWRY.
LUBRICANT TESTING MACHINE.
APPLICATION FILED OCT. 25, 1915.

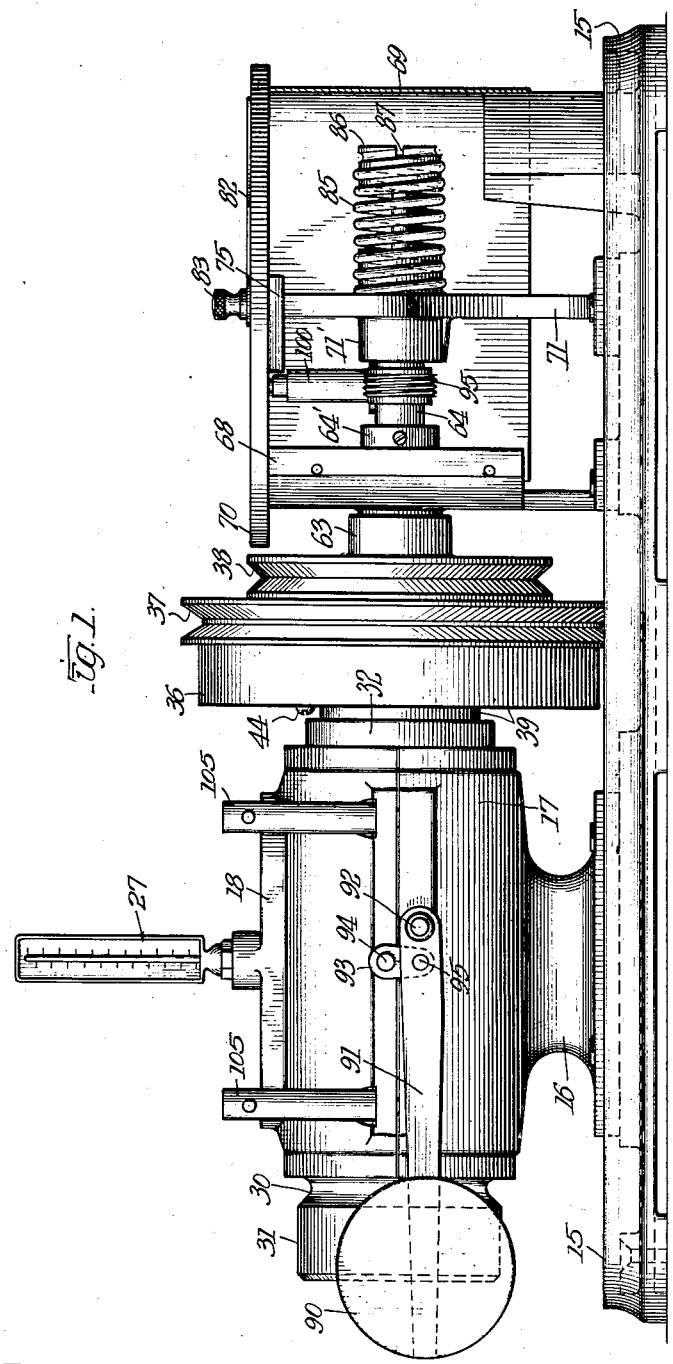

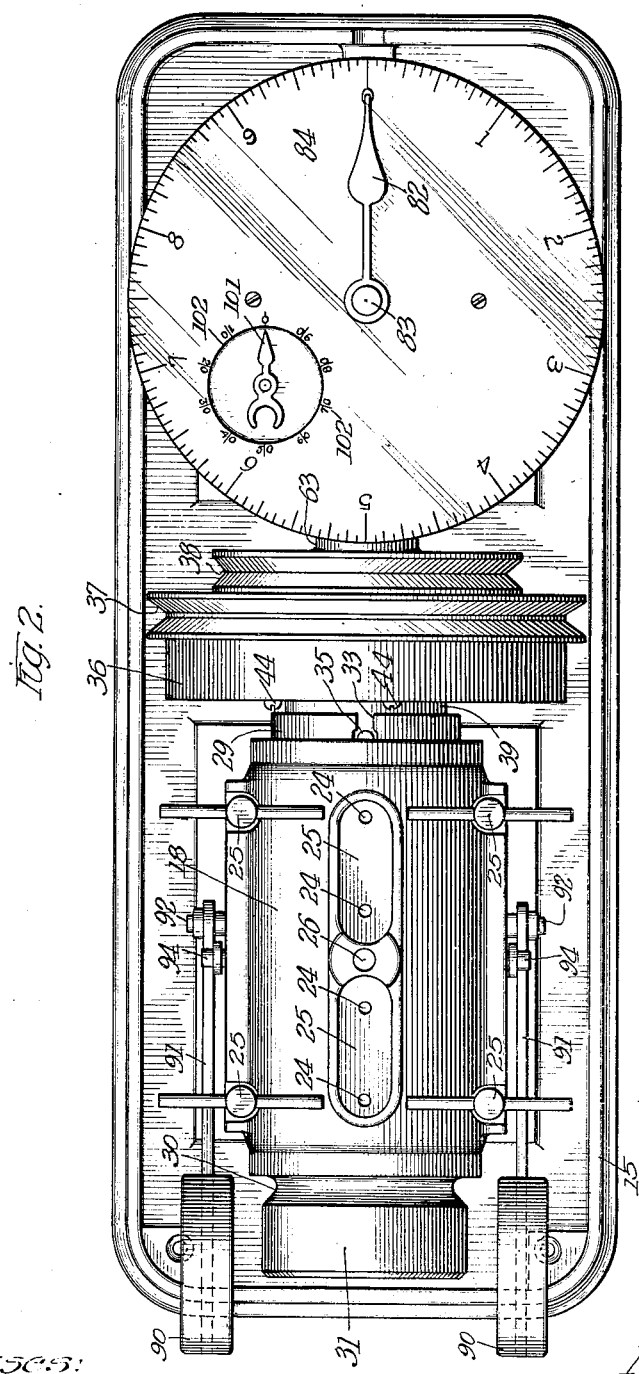

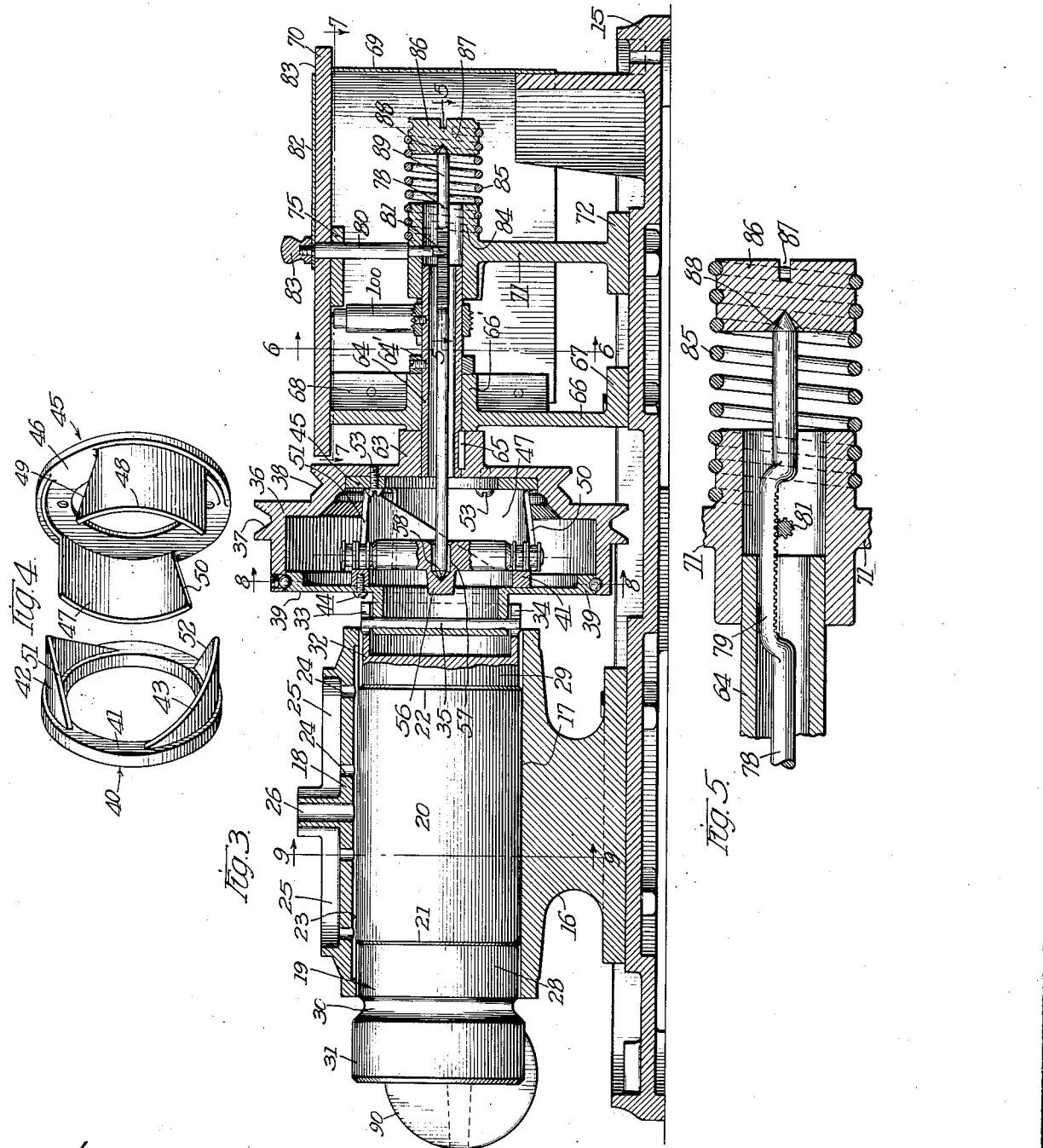

1,194,850.

Patented Aug. 15, 1916.

4 SHEETS—SHEET 4.

Witnesses:
Robert H. Weir
Arthur W. Carlson

Inventor
John W. Lowry
Jones Addington May
attys.

UNITED STATES PATENT OFFICE.

JOHN W. LOWRY, OF CHICAGO, ILLINOIS.

LUBRICANT-TESTING MACHINE.

1,194,850.          Specification of Letters Patent.     Patented Aug. 15, 1916.

Application filed October 25, 1915. Serial No. 57,637.

*To all whom it may concern:*

Be it known that I, JOHN W. LOWRY, a citizen of the United States, residing at Chicago, in the county of Cook and State of Illinois, have invented certain new and useful Improvements in Lubricant - Testing Machines, of which the following is a specification.

My invention relates to improvements in machines for testing and determining the lubricating qualities and durability, and the friction coefficient of lubricants under varying temperature changes.

One of the objects of my invention is to provide an improved machine which is simple in construction, sensitive, durable, accurate and stable in operation.

The general object of my invention is to provide a machine whereby the viscosity, temperature, durability and lubricating life of a liquid, or semi-liquid may be readily indicated and ascertained.

Other and further objects of my invention will become readily apparent to persons skilled in the art, from a consideration of the following description when taken in conjunction with the drawings wherein:—

Figure 6:
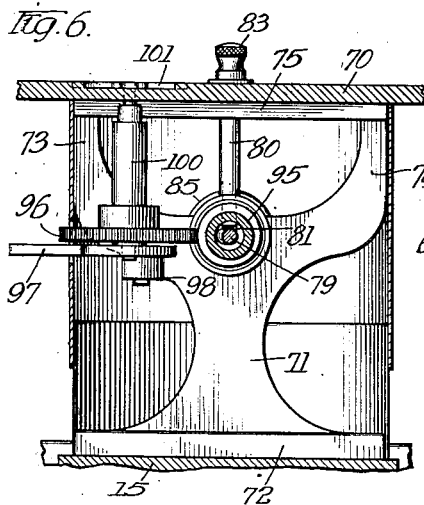
Figure 7:
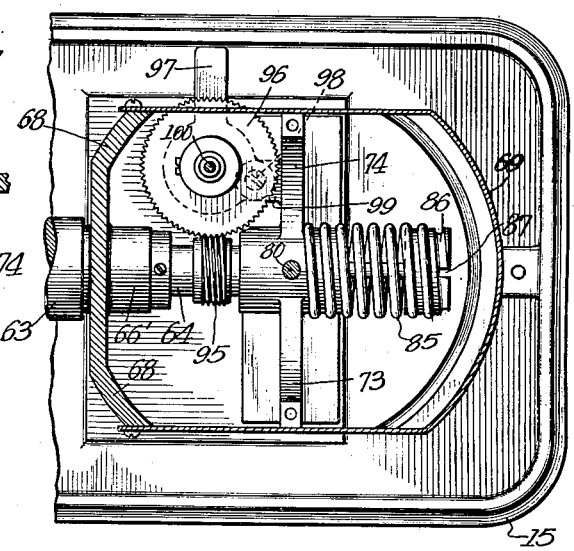
Figure 8:
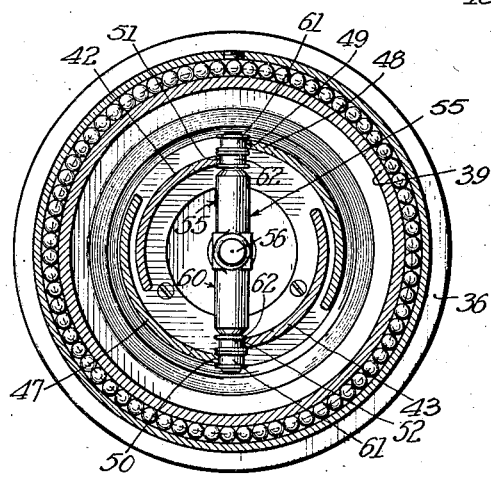
Figure 9:
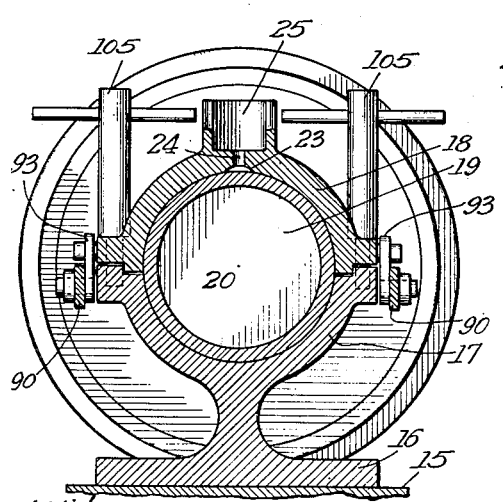
Figure 10:
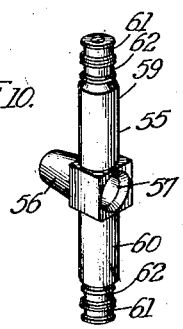

Figure 1 is a side elevation showing parts in section. Fig. 2 is a plan view of the machine. Fig. 3 is a longitudinal central section thereof. Fig. 4 is a perspective view of two coöperating members for transmitting torque resistance of the driven member or rotor, to the indicating index. Fig. 5 is an enlarged section taken on line 5—5 of Fig. 3. Fig. 6 is a transverse section taken on line 6—6 of Fig. 3. Fig. 7 is a horizontal section taken on line 7—7 of Fig. 3. Fig. 8 is a transverse section taken on line 8—8 of Fig. 3. Fig. 9 is a transverse section taken on line 9—9 of Fig. 3. Fig. 10 is an elevation of a rotating connector between the torque transmitting members.

In all the views the same reference characters are employed to indicate similar parts.

Briefly the machine consists of a rotatable spindle or rotor revolving in a split box, the parts of which may be clamped more or less tightly together and yieldingly held by adjustable weights movable along compound levers to adjust the degree of compression or clamping effect of the box members upon the rotor as may be desired; a revoluble driving member influenced by the lubricant under test, by which said axis is driven, and means for transmitting the torque resistance of the rotatable axis to an index, to indicate the relative resistance interposed by said lubricated rotatable axis, and means for indicating the rate of speed of the driving or rotatable member in connection with a thermometer which indicates the variation of temperature of the oil, or other liquid, under test.

On the base 15 is secured a standard 16 including the lower portion 17 of the split box and the coöperating upper portion 18. The rotatable spindle or rotor 19 is provided with a bearing surface 20 to be lubricated, between the boundaries 21 and 22. The box member 18 is provided with an oil receiving channel 23 extending beyond the boundaries 21 and 22 of the rotor. Oil admission apertures 24 permit the oil to be tested to descend from the chambers 25—25 into the groove 23 and into contact with the surface 20 of the rotor 19. An aperture 26 permits insertion of a thermometer 27 into contact with the oil that may be contained in the groove 23 and with the surface 20 of the rotor. The rotor 19 is cut away at its ends, as at 28 and 29, so as to leave a definite surface 20 in contact with the coöperating inner surfaces of the box members 17 and 18. A groove 30 is cut into the rotor, outside of the box, by means of which any oil that may creep over from the surface 28 is thrown off without coming in contact with the handle 31 of the rotor. In the inner end 32 of the rotor is contained opposite driving slots 33 and 34 in which to include a driving pin 35.

36 is a wheel that may be driven by a belt in the groove 37, or to vary the speed, in the smaller groove 38. The wheel 36 has ball bearings in coöperating engagement with the disk 39 that carries a pin 35. A motion transmitting cam member 40 consisting of a ring 41 and projecting cam flanges 42 and 43, is connected to the disk 39, as by screws 44. A coöperating cam member 45 consists of a ring 46 and oppositely tapered cam flanges 47 and 48 which have edge surfaces 49 and 50 that are divergent from the edge surfaces 51 and 52, respectively, of the member 40, scissors like, is connected to the wheel 36, as by screws 53. A T-shaped intermediate member 55 is provided with a central part 56, counter-bored as at 57 for a step bearing 58 at the end of the counter-bore, and projecting arms 59 and 60 each of which carry on their free ends a pair of rollers 61 and 62. The member 55 is included between the divergently tapered and obliquely positioned edges, as edges 49 and 51, 50 and 52 of the flanges 42 and 43, 47 and 48, respectively, of the members 40 and 45. These edges tend to move the member 55 axially toward the index as a result of resistance to rotation imposed by the rotor 19 and opposed by the spring 85. The hub 63, of the wheel 36, is connected to a bearing tube 64, as by means of a feather 65. The rotatable driving tube 64 has bearing in a standard 66 secured to the base 15, as at 67, and outwardly extended, as at 68, to form a part of the housing 69 and to support a dial plate 70. The outer end of the tube 64 rests in another standard 71 secured to the base 15, as at 72, which has laterally extending arms 73 and 74 and a cross member 75 underlying the dial plate 70. A stem 78 pointed at each of its ends extends into the interior of the member 55, and makes contact with the step bearing 58 therein, passes through the tube 64 and is provided with gear teeth, in the form of a rack, as at 79. A vertical stem 80, carrying a pinion 81 on its lower end meshes with the rack 79 and is carried up through the plate 75, which affords an upper bearing therefor, and carries on its upper end an index 82, secured to the stem, as by nut 83. The index sweeps over the scale 84 that is graduated to indicate the friction coefficient of the oil or other material being tested. The hub 84, of the standard 71, is screw threaded to receive an adjustable helical spring 85. In the outer end of the helical spring is inserted a screw threaded plug 86 bearing means 87 for rotating or adjusting the tension of the spring and having a step bearing 88 to receive the pointed end 89 of the stem 78. The spring 85 is under tension, yieldingly and normally presses the member 55 into contact with the ring 41 of the member 40 through the stem 78. When the member 55 is in contact with the ring 40 which is its normal position of rest, the index 82 points to zero on the scale 83.

The box members 17 and 18 are held together with more or less pressure upon the rotor by means of the weights 90—90 that are slidably adjustable along the respective levers 91—91. The inner ends of the levers 91 are pivoted to the lower box member 17, as at 92, and to the upper box member 18 is pivoted a link 93, as at 94, the lower end of which is pivoted to the lever 91, as at 95. This same construction obtains on both sides of the box members.

The rotatable tube 64 carries a worm 95 which is adapted to rotate a worm wheel 96 when the latter is thrown into engagement therewith by means of the handle 97. The handle or lever 97 is pivoted, as at 98, to a projection 99 from the standard 74. A vertically extending stem 100, is a part of or is connected with the worm wheel 96, and extends above the index plate 70 and carries on its upper end an index 101 that sweeps over a scale 102 graduated to indicate, in connection with a watch, the rate of speed of the driving tube 64. The screws 105 serve to hold the box members 17 and 18 in proper relation when the device is not in use and operate as guides when loosened, as when the device is being used, and have no other modifying effect upon its operation.

Before using the machine the rotor 19 is withdrawn from its position between the box members 17 and 18 and thoroughly cleansed, the inner surfaces of the box members being also cleansed before beginning use of the machine. The parts are replaced and a definite amount of oil to be tested is placed in the receptacle 25. The rotor is driven from the pulley 36 by the cam members 40 and 45 through the intervening rolling, axially movable member 55. The oblique cams 49 and 50, bearing upon the member 55 tend to displace it axially—scissors like—against the resisting tension of the spring 85. The extent of this displacement is determined by the resistance to rotation interposed by the rotor 19, the resistance being reduced or modified by the lubricating effect of the oil under test. As the member 55 is, by this means, moved to the right, against the opposing influence of the spring 85, the index 82 is rotated upon the scale 83 through the instrumentality of the stem 80 and the pinion 81 that meshes with the rack 79. As the resistance to rotation of the member 19 is varied by the lubricating effect of the oil under test, the position of the index upon the scale is in like manner changed, thereby constantly indicating upon the scale the coefficient of such resistance. The speed of the driving member, the tube 64, and its connected parts, may be ascertained by moving the lever 97 so that the worm wheel 96 will mesh with the worm 95 carried by the tube. By noting the number of revolutions made by the index 101, in a given time, the rate of speed of the driving member 64 is readily ascertained. The thermometer 27 will indicate the rise or fall of temperature of the lubricant being tested and the weights 90 yieldingly hold the box members 17 and 18 into contact with the surface 20 of the rotor 19.

From the data thus obtained the characteristic of the liquid, or other lubricant under test, may readily be determined.

While I have herein shown a single embodiment of my invention for the purpose of clear disclosure it is manifest that many changes may be made in the arrangement, size and configuration of the various parts within the scope of the appended claims.

Having described my invention, what I claim is:—

1. In a machine of the character described the combination of a driving member; a member to be driven; an index; a member interposed for the transmission of power between the driving and driven members and connected with the index, responsive to rotative displacement of said driving and driven members to move the index.

2. In a machine of the class described the combination of a driving member; a member to be driven; oblique, oppositely inclined cams, one carried by each said member; an index; a member interposed between said cams connected with the index, axially movable in response to rotative displacement of said driving and driven members to move said index.

3. In a machine of the class described the combination of a driving member; a member to be driven; means to maintain a constant predetermined resistance to rotation of the driven member; an index member between the driving and driven members, connected with the index, responsive to rotative displacement of said driving and driven members to move said index; and a spring for resisting said movement.

4. In a machine of the character described the combination of a driving member; a member to be driven; a split box in which the latter member is adapted and arranged to be rotated; means for yieldingly exerting a predetermined pressure upon the driven member, by pressing the box members into contact therewith; a driving connection between the driving and driven members and means axially movable by the rotative displacement of the driving and driven members to move the index.

5. In a machine of the character described the combination of a driving member; a member to be driven; a split box in which the latter member is adapted and arranged to be rotated; means for yieldingly exerting a predetermined pressure upon the driven member, by pressing the box members into contact therewith; a driving connection between the driving and driven members; means axially movable by the rotative displacement of the driving and driven members to move the index and an axially disposed concentric spring adapted and arranged to oppose the said movement.

6. In a machine of the class described the combination with a driving member; of a driven member comprising a spindle; a box-bearing therefor, having a yieldable wall; a weight adjusted to press the wall to a greater or less degree upon said spindle; a cam, carried by the driving member; a co-operating cam carried by the driven member; a member interposed between said cams and connected to the index adapted and arranged to be axially moved by the rotative displacement of said cams to move the index.

7. In a machine of the character described the combination of a driving pulley; a spindle to be driven; two cams obliquely positioned in opposite directions, within said pulley, one carried by each said member; means interposed between said cams adapted and arranged to be axially moved when said cams are rotatively displaced with reference to each other by the resistance to rotation of the driven member; an index to which said means is connected and an axially disposed spring yieldingly opposing the movement of said index moving means.

In testimony whereof I hereunto set my hand in the presence of two subscribing witnesses.

JOHN W. LOWRY.

In the presence of—
FORÉE BAIN,
MARY G. ALLEN.